United States Patent [19]
Schreck

[11] Patent Number: 4,856,979
[45] Date of Patent: Aug. 15, 1989

[54] HEATED CHANNEL FOR PLASTIC INJECTION MACHINES

[76] Inventor: Hans Schreck, Wolkersdorfer Str. 28, D-3559 Burgwald-Bottendorf, Fed. Rep. of Germany

[21] Appl. No.: 173,125

[22] Filed: Mar. 25, 1988

[30] Foreign Application Priority Data

Mar. 31, 1987 [DE] Fed. Rep. of Germany ....... 3710139

[51] Int. Cl.$^4$ ............................................. B29C 45/74
[52] U.S. Cl. ................................ 425/547; 264/328.14; 425/DIG. 13
[58] Field of Search ........................... 425/547–549, 425/DIG. 13; 264/328.14, 328.15, 328.16; 219/201; 249/78

[56] References Cited

U.S. PATENT DOCUMENTS

| | | | |
|---|---|---|---|
| 3,091,812 | 6/1963 | Witkowski | 425/547 X |
| 3,520,026 | 7/1970 | Stidham et al. | 264/328.14 X |
| 3,819,312 | 6/1974 | Arpajian | 425/547 X |
| 3,859,023 | 1/1975 | Pasch | 425/547 |
| 4,500,279 | 2/1985 | Devellian et al. | 425/547 X |
| 4,501,550 | 2/1985 | Nikkuni | 425/548 X |
| 4,563,149 | 1/1986 | Landis | 425/547 |
| 4,669,971 | 6/1987 | Gellert | 425/549 |
| 4,687,613 | 8/1987 | Tsutsumi | 425/547 X |

*Primary Examiner*—Richard L. Chiesa
*Attorney, Agent, or Firm*—Flynn, Thiel, Boutell & Tanis

[57] ABSTRACT

A heated channel for use between a clamping plate and a mold plate of a plastic injection machine. The heated channel includes a heated-channel member having longitudinal bores with cross bores for connecting the connecting and branching nozzles thereon. An insert member with material-guiding bores therein for providing the connection of the nozzles in the clamping plate and the mold plate is inserted into the longitudinal bore. The insert member is provided with grooves for receiving heating elements. Connecting elements for the radial and axial fixing of the heated-channel member and the insert member are inserted into the heated-channel member.

9 Claims, 6 Drawing Sheets

HEATED CHANNEL FOR PLASTIC INJECTION MACHINES

FIELD OF THE INVENTION

The invention relates to a heated channel in the form of a heated channel in block form comprising fastening structure for the clamping plate and mold plate of plastic injection machines.

BACKGROUND OF THE INVENTION

To manufacture plastic articles, plastic injection machines are used for plasticizing the supplied plastic granulates and injecting these with a high pressure into a mold installed into the plastic injection machine. The plastic cools off to a mold-release temperature in this generally tempered mold and can then be removed by ejector means. The working cycle of this machine, namely, the amount of ejection per unit of time is decisive for the feasibility of the plastic injection machine. To increase the speed of ejection, several cavities are as a rule provided, so that several parts can be manufactured simultaneously during the same cycle. It is known to provide several channels in the mold, which channels guide the plastic to the individual cavities. The disadvantage of this method, however, consists in the plastic provided in the channels also having to be ejected, thus creating a considerable waste, which in the case of small articles can amount to several 100% of the weight of the article.

To avoid such waste, it is known to insert heated channels between the clamping plate and the mold plate. These heated channels have nozzles and have the purpose of keeping the plastic ready for injection between the cycles and of limiting the waste. It is known to construct the heated channel in the of a block form and to insert heating elements into the channel with the heated channel having the same temperature inside and outside, namely, at the melting temperature of the plastic. This melting temperature may, for example in the case of polyamide 66 be 260°, while the mold temperature, for purposes of facilitating a quicker hardening of the plastic, is at approximately 60°. The so caused disadvantages consist in the mold plates being able to be supported only through support segments, which results in an unstable mold. The longitudinal expansion between the heated channel and the other areas must thereby be considered simultaneously. Significant cooling is needed in order to keep the mold temperature low, which results in a waste of energy. Moreover, the heated channel also has a large mass and thus causes a great energy consumption.

Furthermore, heated channels are known in which the plastic provided in the bores is heated by heating wires placed into the bores. Surface heating of the plastic has the advantage that the temperature in the plastic is very even and thus very good injection results are achieved. The disadvantage, however, consists in the entire heated channel having to be heated up, resulting in the above-described problems. The heating of the channels in the heated channel from the inside out is more economical and requires less energy, however, the disadvantage exists here that the plastic cools off significantly toward its outer edges, so that in order for the plastic to have a sufficient injection temperature also at the edges, same must be significantly overheated in the center. This also reduces the injection cycles.

The basic purpose of the invention is to avoid the disadvantage of the conventional heated channels, in particular to provide a heated channel which can be connected flat to the clamping plate and mold plate without causing too great a heat transfer onto the clamping plate and mold plate, and which most importantly is easy and economical to manufacture.

According to the invention, the heated channel thus consists of a block in which is arranged a longitudinal bore into which terminate cross bores for the connection of the connecting nozzles and branching nozzles. An insert member with the material-guiding bores for the connection of the cross bores is inserted into the longitudinal bore. The insert member has grooves in its surface, into which grooves heating elements are inserted. Furthermore, connecting elements for facilitating a radial and an axial fixing of the heated-channel member and insert member are inserted in the heated-channel member.

The inventively constructed heated channel is thus constructed at least in two parts and consists of two separately manufacturable members, namely, the heated-channel member and the insert member. After the manufacture of the two members, they are moved into one another and are fixed in radial and also in axial direction by means of the connecting elements such that the material-guiding bores in the insert member are in alignment with the connections in the heated-channel member. The heated-channel member is constructed flat at its two surfaces which will rest on the clamping and the mold plate, so that a flat bearing is here obtained to thus provide a strong connection between the clamping and the mold plates. The insert member in turn does not need to transmit any pressure forces but must merely be constructed to connect the connecting nozzles and the material-guiding bores in the heated-channel member between the clamping plate and the mold plate. The heating elements are inserted into the grooves of the pipe-shaped constructed insert elements. Shielding sheet-metal plates can be placed onto the heating elements, which plates prevent or at least influence a radiation of the heat toward the heated-channel member. Furthermore, an insulating pipe can be moved between the heated-channel member and the insert element, which insulating pipe further reduces the heat flow between the insert element and heated-channel member.

A particularly advantageous and economically manufacturable construction of the heated-channel member is facilitated by the heated-channel member not only having a longitudinal bore, but also at least one bore extending transversely with respect to the longitudinal bore, into which bore nodal elements are inserted. The nodal elements have a corresponding longitudinal bore like the longitudinal bore of the heated-channel member and, moreover, have the connecting bores for supplying and discharging the material. Depending on the number of cavities formed in the mold and the chosen branching in the heated channel, two and more nodal elements can be inserted into the heated-channel member. The nodal elements are fixed in radial direction by the insert member moved therethrough and the heated-channel member, while the axial fixation is done by the connection elements which connect the nodal elements on the one hand to the insert member and on the other hand to the clamping and mold plate.

A significant advantage of an inventive heated channel consists, aside from its simple and strong construction, which permits the flat connection of clamping and mold plate, in the heat requirement being able to be reduced to 30 to 50% compared with otherwise commonly used heated channels which are heated from outside. This at the same time increases the injection cycle.

BRIEF DESCRIPTION OF THE DRAWINGS

Two exemplary embodiments of the invention will be described in greater detail hereinafter in connection with the drawings, in which.

DETAILED DESCRIPTION

Figure 1:
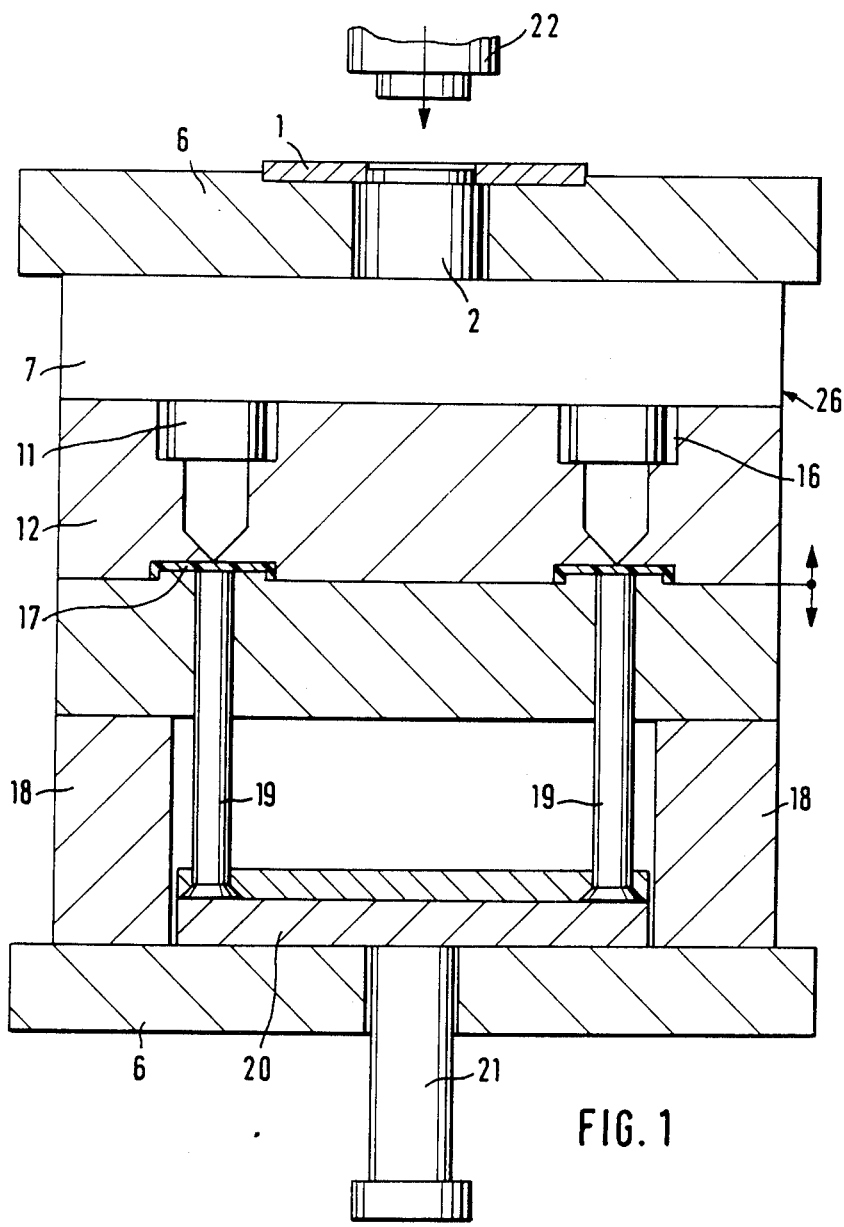
FIG. 1 is a schematic illustration of a plastic injection machine.

FIG. 1 schematically shows a side view of a plastic injection machine. The plastic injection machine consists of two clamping plates 6 between which is clamped a divided mold plate 12 containing the cavities for the die-castings. A heated channel 26 is arranged between the upper clamping plate 6 and the mold plate 12. The heated channel 26 rests flat on the clamping plate 6 and on the mold plate 12. The plastic is fed to the mold plate through the connecting nozzle 2, the heated channel 26 and the nozzles 11. The heated channel has the purpose of keeping the plastic liquidy in the material-supplying bores and to keep in this manner the losses to a minimum.

The mold plate 12 is supported in a downward direction and with respect to the lower clamping plate 6 by two support bars 18. Two ejector pins 19 are used to eject the plastic blank which has solidified in the cavity 17. The ejector pins 19 are moved by an ejector plate 20 on an ejector rod 21. A supply nozzle is identified by the reference numeral 22. The plastic is fed to the connecting nozzle 2 through the supply nozzle.

Figure 2:
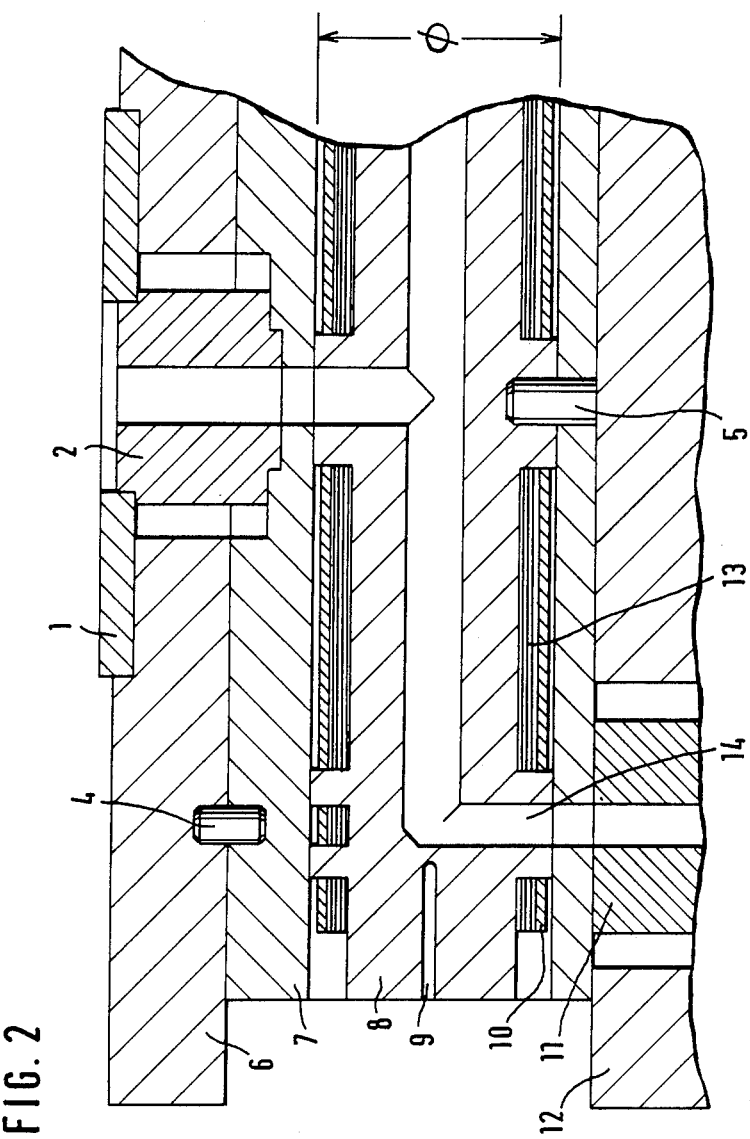
FIG. 2 is a longitudinal cross-sectional view of a heated channel.

FIG. 2 shows an inventive heated channel which is clamped between a clamping plate 6 and a mold plate 12. A centering ring 1 is arranged in the clamping plate 6, which centering ring 1 is used to hold a connecting nozzle 2. The heated channel consists of a heated-channel member 7 into which an insert member 8 is inserted in a longitudinal bore φ. Material-guiding bores 14 are provided in the insert member 8. The plastic is transported through the material-guiding bores 14 from the connecting nozzle 2 to the nozzles 11 to facilitate the injection of the plastic into the cavities 17 of the mold. To radially and also axially fix the heated-channel member 7 in the clamping plate 6, a connecting element 4 is used which extends into holes in the heated-channel member 7 and also in the clamping plate 6.

Grooves are arranged on the outside of the insert member 8. Heating elements 13 are inserted into the grooves. Reflection pipes 10 are placed around the heating elements 13, which pipes protect the heated-channel member 7 against radiated heat. The grooves in the insert member 8 in which is received the heating coils, are connected completely or partially with bores to the outside air.

Figure 3:
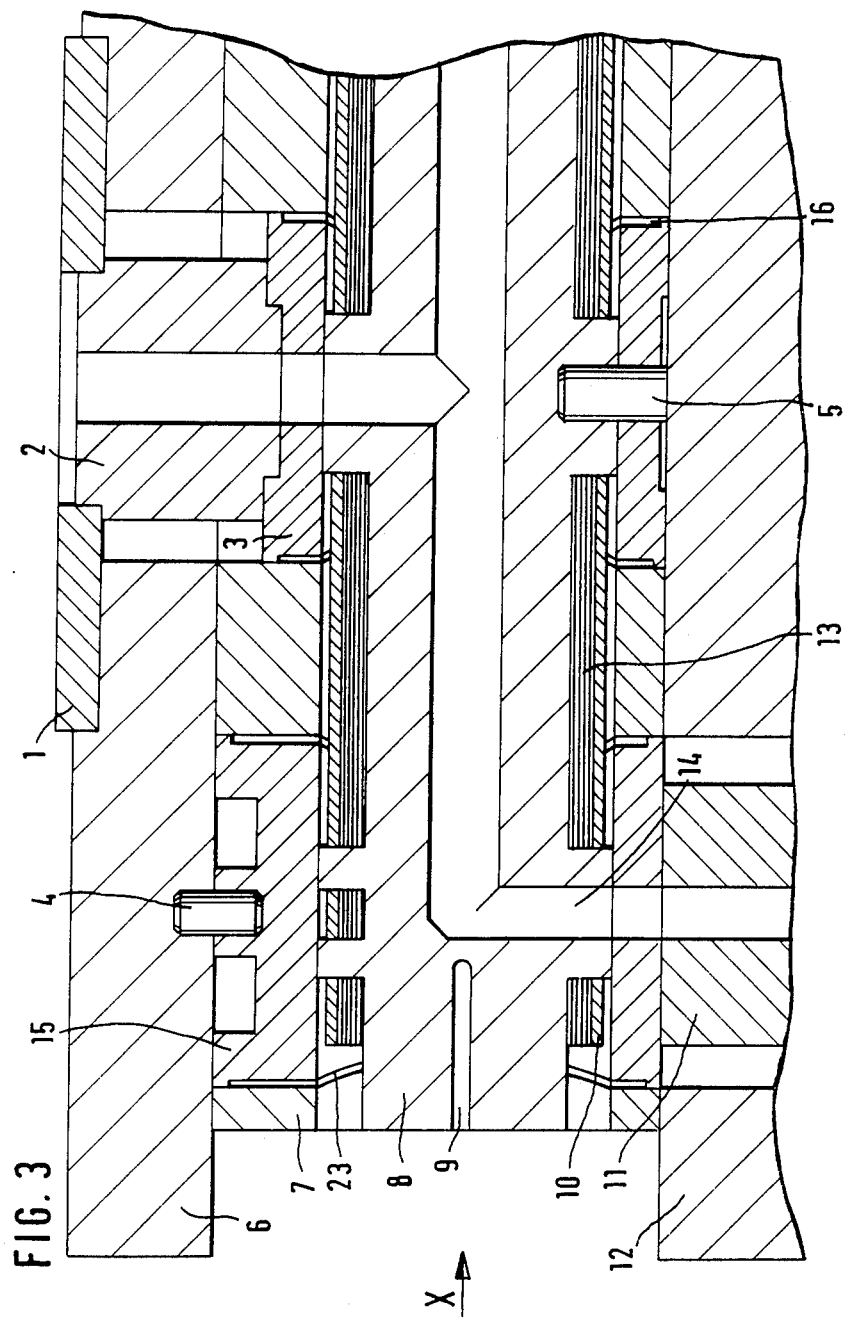
FIG. 3 is a longitudinal cross-sectional view of a further embodiment of a heated channel.
Figure 4:
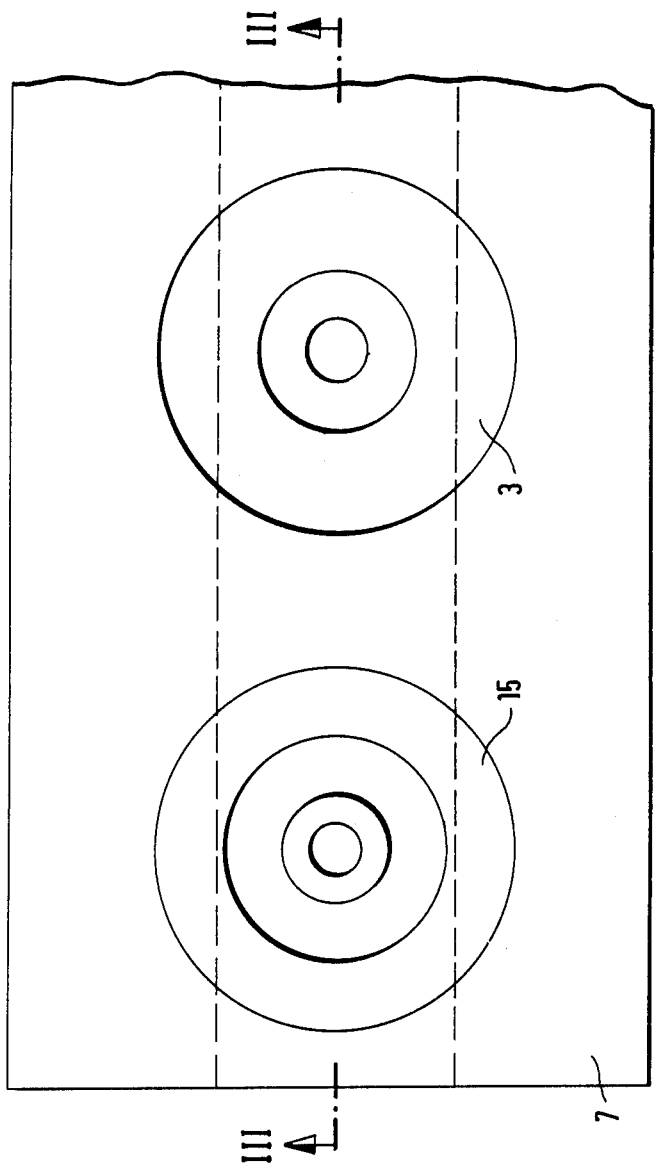
FIG. 4 is a top view of the exemplary embodiment according to FIG. 3.
Figure 5:
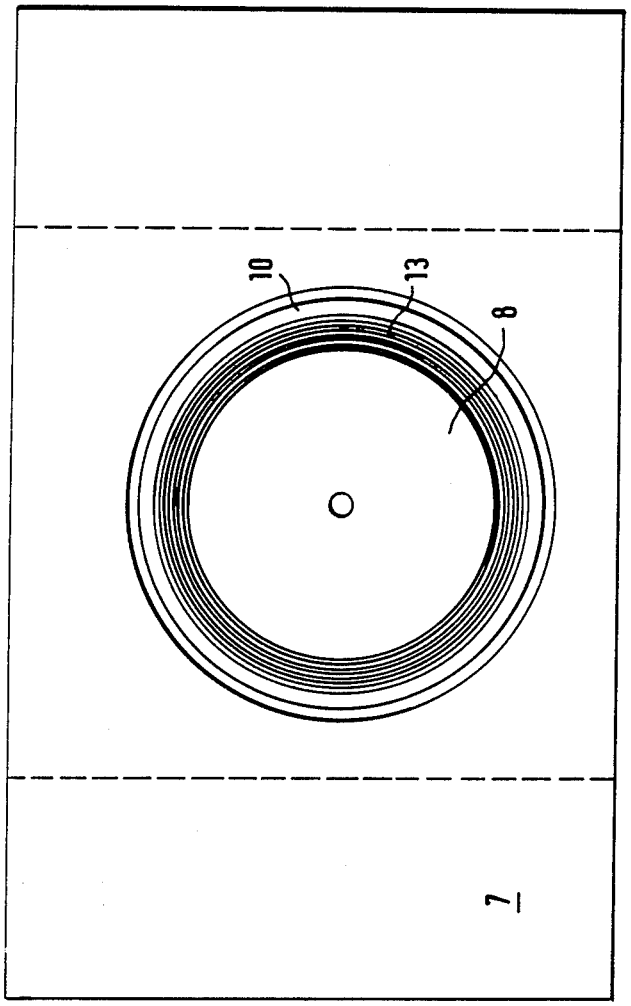
FIG. 5 is a side view of the exemplary embodiment according to FIG. 3.

The exemplary embodiment according to FIGS. 3 to 5 differs from the one according to FIGS. 1 and 2 by providing not only a longitudinal bore for receiving the insert member 8 in the heated-channel member, but also additional bores extending transversely with respect to the longitudinal bore. Nodal elements 3, 15 are inserted into the bores. The nodal elements have the same longitudinal bore 24 as the heated-channel member, so that the insert member 8 can be moved through the heated-channel member and the nodal elements. The nodal elements are fixed in axial direction by the heated-channel member 7. The fixing in radial direction is done by the insert member 8. Connecting elements 4 are used to prevent rotation and to fix the entire heated-channel member to the clamping plate 6 and to the mold plate 12. The connecting elements 4, 5 are inserted into corresponding bores of the nodal elements 15, 3 and of the clamping plate 6 or the insert member 8.

Back tapers 16 are provided in the side surfaces of the nodal elements 3, 15. This has the advantage that only the outer peripheral surfaces of the nodal elements must be worked true to size.

Figure 6:
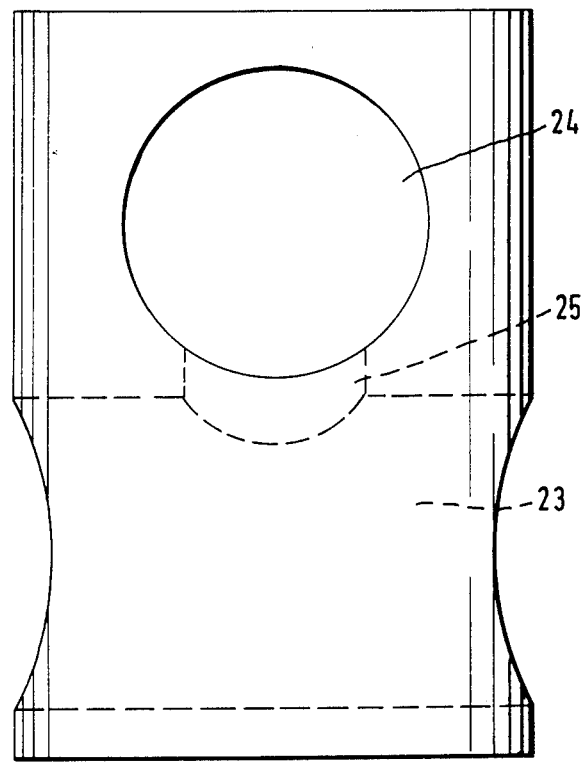
FIG. 6 is a side view of a further embodiment of a nodal element.

FIG. 6 illustrates a further embodiment of a nodal sheet-metal plate. The nodal sheet-metal plate has, in contrast to the nodal sheet-metal plate 15 according to the exemplary embodiment according to FIGS. 3 to 5, two bores 23 and 24, into which insert members are inserted. The two bores are used for the air distribution and are connected with one another by a bore 25.

Although particular preferred embodiments of the invention have been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed are defined as follows:

1. In a heated channel for use between a clamping plate and a mold plate of a plastic injection machine, comprising: a heated-channel member directly engaging said clamping plate and said mold plate and adapted to transmit mold clamping forces between said clamping plate and said mold plate, said heated-channel member having at least one longitudinal bore and at least one cross bore therein for facilitating an interconnecting of connecting and branching nozzles and a delivering and a discharging, respectively, of a liquidy plastic into and out of said heated-channel member, an insert member with material-guiding bores therein for providing a fluid connection of said connecting and branching nozzles, said insert member being received into said longitudinal bore to facilitate said fluid connection, said insert member having grooves on an external surface thereof for receiving heating elements therein for heating said insert member and regions whereat liquidy plastic is delivered to and discharged from said heated-channel member, and connecting means for providing both a radial and an axial fixing of said heated-channel member and insert member to one another and to said clamping plate and said mold plate.

2. The heated channel according to claim 1, wherein said at least one cross bore in said heated-channel member includes at least one enlarged bore extending transversely with respect to said longitudinal bore and extending through said heated-channel member, wherein a nodal element is inserted into said enlarged bore, said nodal element having bores coaxial with said longitudinal bore in said heated-channel member and said material-guiding bores in said insert member for facilitating said connection to at least one of said connecting nozzle and said branching nozzle.

3. The heated channel according to claim 2, wherein said connecting means is engaged with said nodal element.

4. The heated channel according to claim 2, wherein said nodal element has at least two bores therein positioned transversely of one another and which are connected to one another through a further bore.

5. The heated channel according to claim 2, wherein said nodal element has a circular cross section, and wherein said enlarged bore also has a circular cross section conforming in size so as to snugly receive said nodal element therein.

6. The heated channel according to claim 1, wherein a thermo-element is inserted into said insert member.

7. The heated channel according to claim 1, wherein a heat-reflection pipe encircles said heating elements so as to cause the heat generated thereby to heat said insert member more than said heated-channel member.

8. The heated channel according to claim 1, wherein said insert member is circular in cross section, and wherein said longitudinal bore in said heated-channel member is of a circular cross section conforming in size so as to snugly receive said insert member therein.

9. The heated channel according to claim 1, wherein said clamping plate and said mold plate having opposing flat surfaces thereon, and wherein said heated-channel member has oppositely facing flat surfaces thereon each directly engaging a respsective one of said flat surfaces on said clamping plate and said mold plate.

* * * * *